Oct. 11, 1932.  C. H. HAPGOOD  1,882,320
PNEUMATIC AND ELECTRIC CONNECTER FOR MILKING MACHINES
Filed March 5, 1929
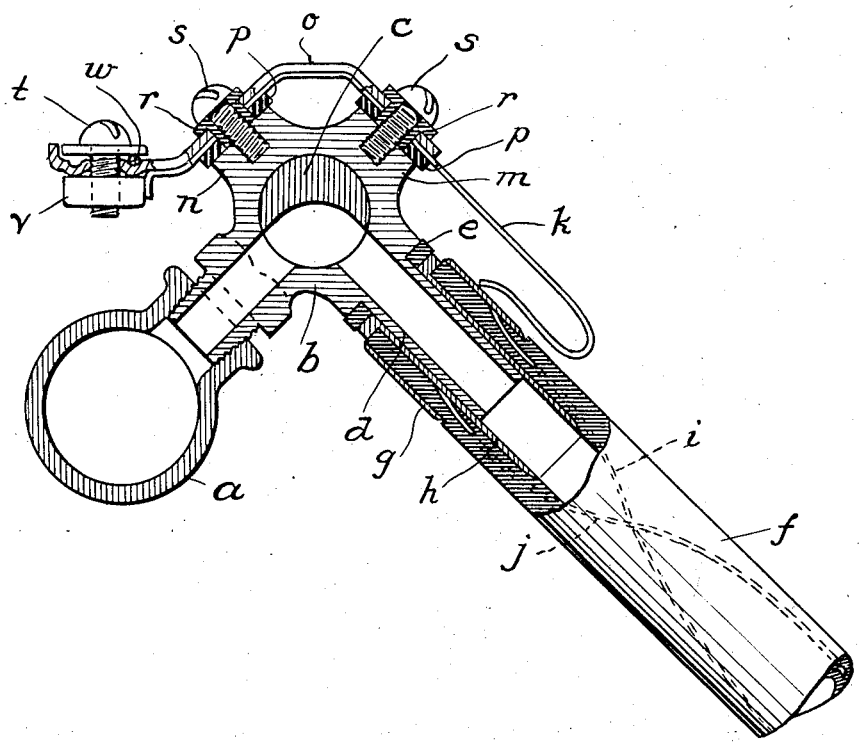
WITNESS:
INVENTOR
Cyrus Howard Hapgood
BY
ATTORNEYS.

Patented Oct. 11, 1932

1,882,320

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

PNEUMATIC AND ELECTRIC CONNECTER FOR MILKING MACHINES

Application filed March 5, 1929. Serial No. 344,419.

In the art of milking machines, it is known to provide a vacuum pipe line connected with a vacuum pump and provided with cocks to either of which is connectible a separate hose, which is in turn connectible with the vacuum chamber of a milking machine unit, such vacuum chamber being connectible, through the milk pail and a milk tube, with the inner chambers of a set of teat cups. It is also known to connect the outer or pulsation chambers of the teat cups with a pulsation tube, and to provide a primary pneumatic pulsator which will connect said pulsation tube, either directly or through a secondary pneumatic pulsator, alternately with atmosphere and with said vacuum chamber and thereby transmit pneumatic pulsations to the pulsation chambers of the teat cups. It is also known to operate the primary pulsator by means of an electro-magnet and to operate the magnet through an electric circuit, which is closed through the magnet when the hose is connected at one end to the vacuum pipe line and at the other end to the vacuum chamber of the milking machine unit. Such a pneumatically and electrically operated milking machine is set forth in an application filed by C. H. Hapgood December 24, 1927, Serial No. 242,329. In said application, one pole of the electric generator is connected with the vacuum pipe line and the other pole with a terminal adjacent to each cock; one pole of the magnet is connected to the nozzle communicating with the vacuum chamber on the milk pail and the other with a terminal adjacent thereto; and the hose carries two wires which complete the circuit when the hose is connected at opposite ends to said cock and nozzle; there being means to open and close the circuit (that is, to produce electric pulsations therein) so as to intermittently energize the magnet and thereby actuate the primary pneumatic pulsator.

The object of the present invention is to provide an improved pneumatic and electric connecter or cock which is adapted to be secured to the main vacuum pipe and to which the corresponding end of the hose is adapted to be secured. The invention is also applicable to any type of milking machine wherein pneumatic and electric connections are desired to be made between one end of a hose, tube or pipe and an air conduit and electric terminals.

The accompanying drawing, which illustrates a preferred embodiment of the invention, is a sectional view of the main vacuum pipe, an end of the hose and means for pneumatically connecting the hose with the vacuum pipe and electrically connecting the hose with electric terminals.

To a main vacuum pipe $a$ is secured a combination pneumatic and electric connecter or cock $b$. The connecter is angular in form. One arm of the connecter extends obliquely upward from the vacuum pipe to a valve chamber located at the angle of the connecter. The other arm of the connecter extends obliquely downward from the valve chamber. The arms of the connecter are provided with air conduits, which are connected together when the plug valve $c$ is moved into the open position shown. The obliquely downwardly extending arm of the connecter terminates in a tube or nozzle $d$ having a soft packing ring $e$ around its neck.

A rubber tube or hose $f$ has embedded in its walls two wires $i$ and $j$. Wire $i$ is attached to, or in permanent electrical connection with, a ring $g$ around the end of tube $f$. Wire $j$ is attached to, or in permanent electrical connection with, a ferrule $h$, which is forced inside the end of tube $f$.

In connecting tube $f$ with connecter $b$, ferrule $h$ is slipped over nozzle $d$. Thereby pneumatic connection is established between the connecter and tube $f$, and electrical connection is established between wire $j$ and the vacuum pipe $a$.

Projecting from connecter $b$ at different angles are two lugs or projections $m$ and $n$. Preferably lug $m$ is about in line with the obliquely upwardly extending arm of the connecter and lug $n$ is about in line with the obliquely downwardly extending arm of the connecter. Extending from one lug to the other are a contact finger $k$ and a reinforcing contact bar $o$. Applied to the flat outer face of each lug is an annular washer $p$ of insulating material. Extending through holes in bar *o* and finger *k* and through washer *p* is a sleeve *r* of insulating material. Extending through sleeve *r* into a threaded hole in the lug is a screw *s*. The screw head overlies an annular flange on sleeve *r* and confines sleeve *r*, bar *o*, finger *k* and washer *p* against the flat outer face of the lug.

Finger *k* extends beyond lug *m* and along tube *d* and is thence bent inward upon itself and contacts with ring *g* when tube *f* is slipped onto the connecter.

It will be understood that contact finger *k* is flexible and elastic but that along that part thereof which extends along the reinforcing bar it is held rigid. The contact finger and its reinforcing bar being secured in fixed relation to connecter *b* at two spaced apart points, it is impossible for the free spring end of the contact finger to be turned or twisted out of its desired position.

Reinforcing bar *o* is extended beyond lug *n* and its end is confined between the head of a bolt *t* and a nut *v*. The end of bar *o* is so bent as to receive, at an angle formed by one of the bends, the end of a wire *w*, which is connected with one pole of the electric circuit. Contact finger *k* also extends beyond lug *n* and has a downturned end which engages one of the flat sides of nut *v* and thus locks the nut from turning.

The vacuum pipe *a* being connected with one pole of the electric circuit and wire *w* with the other pole of the circuit, the connection of the tube or hose *f* with the nozzle *d* of connecter *b* connects the two wires *i* and *j* respectively with the two poles of the electric circuit. When valve *c* is opened pneumatic connection is provided between vacuum pipe *a* and the tube or hose *f*.

Having now fully described my invention, what I claim and desire to protect by Letters Patent is:—

1. The combination with an air pipe, of a connecter secured thereto and having an air conduit, a tube connectible with the connecter, a contact finger having a flexible and elastic end, a reinforcing member of more rigid material than the contact finger extending along part of the length of the contact finger, and means to secure the contact finger and its reinforcing member to the connecter at two spaced apart points thereon, the contact finger extending substantially beyond one of said points and the contact finger and reinforcing member being free between said points.

2. The combination with an air pipe, of a connecter secured thereto and having an air conduit, a tube connectible with the connecter, a contact finger having a flexible and elastic end adapted to be engaged with the tube when the latter is applied to the connecter, the contact finger being provided with a bend beyond its flexible end, and means to secure the contact finger to the connecter on opposite sides of said bend.

3. The combination with an air pipe, of a connecter secured thereto and having an air conduit, a tube connectible with the connecter, a contact finger having a flexible and elastic end, a reinforcing member bent between its ends and along which the contact finger, beyond its flexible end, extends, and means to secure the reinforcing member and contact finger to the connecter on opposite sides of the bends therein.

4. The combination with an air pipe, of a connecter provided with an air conduit and comprising an arm extending obliquely upward from and secured to the air pipe and an arm extending at an angle to the first arm, and a contact finger secured to the upper side of the connecter at a point substantially opposite the upwardly extending arm thereof and at a point substantially opposite the other arm thereof, the contact finger being bent between its points of attachment to the connecter and provided with a flexible and elastic end.

5. The combination with an air pipe, of a connecter provided with an air conduit and comprising an arm extending obliquely upward from and secured to the air pipe and an arm extending at an angle to the first arm, a contact finger and a reinforcing member therefor both secured in fixed relation to the connecter at a point substantially opposite the upwardly extending arm thereof and at a point substantially opposite the other arm thereof, the contact finger being of flexible and elastic material and having a free end extending beyond its reinforcing member and the first named point of attachment to the connecter.

6. The combination with an air pipe, of a connecter secured thereto and having an air conduit, a tube connectible with the connecter, a contact finger having a flexible and elastic end, a reinforcing member extending along part of the length of the contact finger, and means to secure the contact finger and its reinforcing member in fixed relation to the connecter, the reinforcing member extending beyond the other end of the contact finger, and a binding post carried on the end of the reinforcing member.

7. The combination with an air pipe, of a connecter secured thereto and having an air conduit, a tube connectible with the connecter, a contact finger having a flexible and elastic end, a reinforcing member bent between its ends and along which the contact finger, beyond its flexible end, extends, and means to secure the reinforcing member and contact finger to the connecter on opposite sides of the bends therein, the reinforcing member extending beyond the other end of the contact finger, and a binding post carried on the end of the reinforcing member.

8. The combination with an air pipe, of a connecter provided with an air conduit and comprising an arm extending obliquely upward from and secured to the air pipe and an arm extending at an angle to the first arm, a contact finger and a reinforcing member therefor both secured in fixed relation to the connecter at a point substantially opposite the upwardly extending arm thereof and at a point substantially opposite the other arm thereof, the contact finger being of flexible and elastic material and having a free end extending beyond its reinforcing member and the first named point of attachment to the connecter, the reinforcing member extending beyond the other end of the contact finger, and a binding post carried on the end of the reinforcing member, said binding post comprising a bolt and nut, said other end of the contact finger having its end bent into locking relationship with said nut.

9. Means for establishing pneumatic and electric connections in milking machines consisting of a connecter comprising two arms in angular relationship containing an air conduit, an electric conductor secured between its ends to the exterior of the connecter at two spaced apart points, leaving an intermediate part of the conductor and both its ends free, and a binding post carried on one free end of the conductor, the other free end of the conductor comprising a flexible and elastic contact finger.

10. Means for establishing pneumatic and electric connections in milking machines consisting of a connecter comprising two arms in angular relationship containing an air conduit, projections on the connecter extending at an angle one to the other, an electric conductor extending along said arms and secured to and insulated from said projections, and a binding post carried on one free end of the conductor, the other free end of the conductor comprising a flexible and elastic contact finger.

11. Means for establishing pneumatic and electric connections in milking machines consisting of a connecter comprising two arms in angular relationship containing an air conduit, an electric conductor comprising flexible and elastic material and a reinforcing and comparatively rigid member extending along and contacting with the contact finger, said reinforcing member and contact finger secured to the connecter at two spaced apart points, the contact finger extending beyond one end of the reinforcing member, and a binding post carried by the reinforcing member at its other end.

12. Means for establishing pneumatic and electric connections in milking machines consisting of a connecter comprising two arms in angular relationship containing an air conduit, projections on the connecter extending at an angle one to the other, an electric conductor extending along said arms and comprising a contact finger of flexible and elastic material and a reinforcing and comparatively rigid member extending along and contacting with the contact finger, said reinforcing member and contact finger secured to and insulated from said projections, the contact finger extending beyond one end of the reinforcing member, and a binding post carried by the reinforcing member at its other end.

13. Means for establishing pneumatic and electric connections in milking machines consisting of a connecter comprising two arms in angular relationship containing an air conduit, projections on the connecter extending at an angle one to the other, an electric conductor extending along said arms and comprising a contact finger of flexible and elastic material and a reinforcing and comparatively rigid member extending along and contacting with the contact finger, said reinforcing member and contact finger secured to and insulated from said projections, the contact finger extending beyond one end of the reinforcing member, a binding post comprising a bolt and nut carried by the reinforcing member at its other end, the corresponding end of the contact finger lockably engaging said nut.

In testimony of which invention, I have hereunto set my hand, at New York, on this 13th day of February, 1929.

CYRUS HOWARD HAPGOOD.